(12) United States Patent
Barwise et al.

(10) Patent No.: US 10,012,764 B2
(45) Date of Patent: Jul. 3, 2018

(54) SYSTEM AND METHOD FOR DETERMINING RETAINED HYDROCARBON FLUID

(75) Inventors: Tony Barwise, Middlesex (GB); Mark James Osborne, Middlesex (GB)

(73) Assignee: BP EXPLORATION OPERATING COMPANY LIMITED, Middlesex (GB)

( * ) Notice: Subject to any disclaimer, the term of this patent is extended or adjusted under 35 U.S.C. 154(b) by 441 days.

(21) Appl. No.: 14/427,751

(22) PCT Filed: Sep. 12, 2012

(86) PCT No.: PCT/EP2012/067872
§ 371 (c)(1),
(2), (4) Date: Mar. 12, 2015

(87) PCT Pub. No.: WO2014/040622
PCT Pub. Date: Mar. 20, 2014

(65) Prior Publication Data
US 2015/0212235 A1 Jul. 30, 2015

(51) Int. Cl.
*G01V 99/00* (2009.01)
*G01V 1/50* (2006.01)
*G06F 17/18* (2006.01)

(52) U.S. Cl.
CPC .............. *G01V 99/005* (2013.01); *G01V 1/50* (2013.01); *G06F 17/18* (2013.01); *G01V 2210/62* (2013.01)

(58) Field of Classification Search
CPC .... G01V 99/005; G01V 2210/62; G01V 1/50; G06F 17/18
See application file for complete search history.

(56) References Cited

U.S. PATENT DOCUMENTS 9,262,563 B2 * 2/2016 Williams ............ G06F 17/5009
2008/0059140 A1 * 3/2008 Salmon .................. E21B 49/00
703/12

(Continued)

FOREIGN PATENT DOCUMENTS

EP     2 202 515 A2    6/2010

OTHER PUBLICATIONS

Jarvie, Daniel et al. "Unconvetional shale-gas systems: The Mississippian Barnett Shale" AAPG bulletin 91.4 (2007): pp. 475-499 [retreived on May 9, 2017]. Retrieved from <http://www.wwgeochem.com/app/download/7752193/Jarvie+et+al.+2007+AAPG+Bulletin+-+Unconventional+shale-gas+systems.pdf>.*

(Continued)

*Primary Examiner* — Kamini S Shah
*Assistant Examiner* — Alfred Wechselberger
(74) *Attorney, Agent, or Firm* — Conley Rose, P.C.

(57) ABSTRACT

A computer-implemented method for determining an amount of hydrocarbon fluid present in a rock of a hydrocarbon-producing reservoir is provided. The rock comprises organic matter and porous and permeable inorganic matter. The method comprises the steps of receiving data relating to chemical and kinetic properties of the organic matter, rock lithology data, rock thickness and reservoir temperature and pressure data, inputting the received data into a computer-implemented model, and operating the model. The model operates to a) simulate hydrocarbon fluid generation in the rock based on the input data and thereby determine an amount of generated hydrocarbon fluid, b) generate predicted data, and c) determine a total amount of hydrocarbon fluid present in the rock based on the predicted data. The generated predicted data is indicative of i) an amount of the generated hydrocarbon fluid adsorbed onto a surface of the (Continued)

organic matter within the rock, ii) an amount of the generated hydrocarbon fluid present in the pores of the organic matter by determining the porosity of the organic matter, based on the chemical and kinetic properties of the organic matter, and iii) an amount of the generated hydrocarbon fluid present in the pores of the inorganic matter by determining the porosity of the inorganic matter, based on the rock lithology data. A corresponding system, a computer program and a computer readable medium are also provided.

8 Claims, 10 Drawing Sheets

(56) References Cited

U.S. PATENT DOCUMENTS

| | | | | |
|---|---|---|---|---|
| 2010/0155078 | A1* | 6/2010 | Walters | E21B 41/00 166/369 |
| 2012/0179444 | A1 | 7/2012 | Ganguly et al. | |
| 2012/0325462 | A1* | 12/2012 | Roussel | E21B 43/26 166/250.1 |
| 2013/0262069 | A1* | 10/2013 | Leonard | E21B 43/00 703/10 |

OTHER PUBLICATIONS

Romero-Sarmiento, Maria-Fernanda et al. "Predicting TOC, Organic Porosity and Gas Retention and Distribution in a Shale-Gas System." Search and Discovery Article #40973 (2012). Posted on Jul. 16, 2012 [retreived on May 10, 2017]. Retreived from <http://www.searchanddiscovery.com/documents/2012/40973romero/ndx_romero.pdf>.*
Al-Hajeri, Mubarak et al. "Basin and petroleum system modeling." Oilfield Review 21.2 (2009): pp. 14-29 [retreived on May 9, 2017]. Retrieved from <http://www.slb.com/~/media/Files/resources/oilfield_review/ors09/sum09/basin_petroleum.pdf>.*
Schneider, F et al. "A 3D Basin Model for Hyrdocarbon Potential Evaluation: Application to Congo Offshore." Oil & Gas Science and Technology 55.1 (2000): pp. 3-13 [retreived on May 10, 2017]. Retreived from <http://ogst.ifpenergiesnouvelles.fr/articles/ogst/abs/2000/01/schneider_v55n1>.*
Alexander, Tom et al. "Shale Gas Revolution." Oilfield Review 23.3 (2011): pp. 40-55 [retreived on May 10, 2017]. Retreived from <https://www.slb.com/~/media/Files/resources/oilfield_review/ors11/aut11/04_shale_gas_revolution.pdf>.*
Colwell, FS et al. "Estimates of Biogenic Methane Production Rates in Deep Marine Sediments at Hydrate Ridge, Cascadia Margin." Applied and environmental microbiology 74.11 (2008): pp. 3444-3452 [retreived on May 9, 2017]. Retreived from <http://aem.asm.org/content/74/11/3444.full.pdf+html>.*
Pang, Xiongqi et al. "Dynamics of Hydrocarbon Expulsion From Shale Source Rocks." Energy Exploration and Exploitation 23.5 (2005): pp. 333-355 [retrieved on May 10, 2017]. Retreived from <http://journals.sagepub.com/doi/pdf/10.1260/014459805775992735>.*
Mengal, et al. "Accounting for Adsorbed Gas in Shale Reservoirs." Society of Petroleum Engineers, SPE 141085 (2011) [retrieved on Jan. 25, 2018]. Retrieved from STIC.*
Montgomery, et al. "Mississippian Barnett Shale, Fort Worth basin, north-central Texas: Gas-shale play with multi-trillion cubic foot potential." AAPG Bulletin, vol. 89 No. 2 (2005), pp. 155-175 [retrieved on Jan. 24, 2018]. Retrieved from <http://bluescaperesources.com/main/wp-content/uploads/about/technicalpublications/gas_shale_play_fact_book.pdf>.*
Killops, et al. "Predicting generation and expulsion of paraffinic oil from vitrinite-rich coals." Organic Geochemistry, vol. 29, No. 1-3 (1998) [retrieved on Jan. 23, 2018]. Retrieved from <https://www.sciencedirect.com/science/article/pii/S0146638098000874>.*
Hartman et al. "Recent Advances in the Analytical Methods Used for Shale Gas Reservoir Gas-in-Place Assessment." Search and Discovery Article #40317 (2008) [retrieved on Jan. 23, 2018]. Retrieved from <http://www.searchanddiscovery.com/documents/2008/08209hartman/hartman-40317.pdf>.*
Ambrose et al. "Shale Gas-in-Place Calculations Part I: New Pore-Scale Considerations" SPE 131772: SPE Journal (2012) [retrieved on Jan. 24, 2018]. Retrieved from STIC.*
Glorioso, J.C., et al; "Unconventional Reservoirs: Basic Petrophysical Concepts for Shale Gas"; SPE/EAGE European Unconventional Resources Conference and Exhibition; pp. 1-38, Mar. 21, 2012, XP055072033.
Romero-Sarmiento, Maria-Fernanda, et al; "Quantitative evaluation of TOC, organic porosity and gas retention distribution in a gas shale play using petroleum system modeling: Application to the Mississippian Barnett Shale"; Marine and Petroleum Geology, vol. 45, pp. 315-330, Apr. 22, 2013, XP055072036.
IMOG 2011, Osborne and Barwise; Beyond Orgas BP's New Predictive Model for Biogenic and Thermogenic Gas Expulsion from Source Rocks—25$^{th}$ International Meeting on Organic Geochemistry, Sep. 18-23, 2011, Switzerland w/Abstract.
Geol Soc 2011, Osborne and Barwise, Beyond Orgas: BP's New Predictive Model for Biogenic and Thermogenic Gas Expulsion from Source Rocks—Source Rocks Conference, Geological Society of London, Sep. 12-13, 2011 w/Abstract.
Pepper, A.S. and Corvi, P.J., "Simple Kinetic Models of Petroleum Formation: Oil and Gas Generation from Kerogen"; Marine and Petroleum Geology, 12 (1995): 291-319.
Pepper, A.S. and Corvi, P.J., "Simple Kinetic Models of Petroleum Formation: Modelling an Open System"; Marine and Petroleum Geology, 12 (1995): 417-452.
Pepper, A.S. and Dodd, T.A.; "Simple Kinetic Models of Petroleum Formation Part II: oil-gas cracking"; Marine and Petroleum Geology, 12 (1995): 321-340.
Glorioso, J.C., et al; "Unconventional Reservoirs: Basic Petrophysical Concepts for Shale Gas"; SPE 153004, Society of Petroleum Engineers; pp. 1-38, (2012) #1.
Romero-Sarmiento, M.-F., et al; "Quantitative evaluation of TOC, organic porosity and gas retention distribution in a gas shale play using petroleum system modeling: Application to the Mississippian Barnett Shale"; Marine and Petroleum Geology, vol. 45, pp. 315-330 (2013) #4.
Osborne, M. and Barwise, T.; "Beyond Orgas—BP's New Predictive Model for Biogenic and Thermogenic Gas Expulsion from Source Rocks"—25$^{th}$ International Meeting on Organic Geochemistry, IMOG 2011, pp. 1-18; (2011) #7.
Osborne, M. and Barwise, T.; Beyond Orgas—BP's New Predictive Model for Biogenic and Thermogenic Gas Expulsion from Source Rocks (Oral Presentation) Conference, Geological Society of London, 1 pg., #8, (2011), (Abstract to accompany Item #7).
Osborne, M. and Barwise, T.; "Beyond Orgas—BP's New Predictive Model for Biogenic and Thermogenic Gas Expulsion from Source Rocks"; Source Rocks: Character, Prediction and Value, pp. 1-18, (2011) #9.
IMOG Abstract Template; "Beyond Orgas—BP's New Predictive Model for Biogenic and Thermogenic Gas Expulsion from Source Rocks", 1 pg., #10 (2011), (Abstract to accompany Item #9).
Pepper, A.S., et al; "Simple kinetic models of petroleum formation. Part I: oil and gas generation from kerogen"; Marine and Petroleum Geology, vol. 12(3), pp. 291-319 (1995) #11.
Pepper, A.S., et al; "Simple kinetic models of petroleum formation. Part III: Modelling an open system"; Marine and Petroleum Geology, vol. 12(4), pp. 417-452 (1995) #12.
Pepper, A.S., et al; "Simple kinetic models of petroleum formation. Part II: oil-gas cracking"; Marine and Petroleum Geology, vol. 12(3), pp. 321-340 (1995) #13.
PCT Notification Concerning Transmittal of International Preliminary Report on Patentability with IPRP and PCT Written Opinion of the Int'l Searching Authority, dated Mar. 26, 2015; Int'l Application No. PCT/EP2012/067872; Int'l Filing Date Sep. 12, 2012 (8 pgs.).

* cited by examiner

SYSTEM AND METHOD FOR DETERMINING RETAINED HYDROCARBON FLUID

This application is the U.S. national phase of International Application No. PCT/EP2012/067872 filed Sep. 12, 2012, the entire contents of which is hereby incorporated by reference.

TECHNICAL FIELD

The present invention relates to a computer-implemented method and system for determining an amount of hydrocarbon present in a hydrocarbon-producing source rock.

BACKGROUND

BP's "Orgas" kinetic scheme, was created in the 1980s-early 1990s to model the generation of hydrocarbon fluid (oil and gas) in a reservoir source rock and hence predict the oil and gas volume expelled from organic matter associated with different types of source rock. The Orgas scheme uses different chemical kinetics to describe the generation of oil and gas from organic matter types called "organofacies" which have been defined by BP. Organic matter preserved in basins is mainly bound into an organic polymer (kerogen) which requires the input of heat before it breaks down into oil and gas. This breakdown occurs typically at temperatures of between 100° C. and 230° C. depending on kerogen type. Expulsion of oil and gas does not occur until the kerogen is saturated with oil and gas. Adsorption coefficients for oil and gas are defined based on observed levels of oil and gas in source rocks.

The Orgas scheme uses five different organofacies types. These types relate to the type of organic matter preserved in different types of depositional environments and each type differs in that they generate oil and gas at different temperatures with different chemical kinetics. Different kinetics of oil and gas generation have been established for each organofacies type from laboratory experiments and from observations of naturally heated source rocks in actively generating basins. Organofacies type is a key factor in determining the type and quantity of hydrocarbon fluid that is released upon heating. The link between organofacies type and depositional environment enables reservoir engineers to predict what type of source rock may be present when samples are unavailable.

Once the organofacies type of the source rock has been defined, the next step is to define the richness of the source. The basic measurement which defines this is the total organic carbon content (TOC) which is usually expressed as wt % of organic components of the rock. This organic carbon is sub-divided into reactive and inert fractions and the reactive part can be either oil-prone or gas-prone, generating predominantly oil or gas upon heating.

To determine how much reactive and inert kerogen is present in a source rock, samples of the source rock are heated in a Rock-Eval™ pyrolysis type apparatus at a temperature of between 250° C. and 550° C. The mass of oil and gas that evolve from the source rock with increasing temperature are measured and are divided up into two main peaks—P1 and P2, which are normally expressed as kg/tonne or parts per thousand mass of petroleum per mass of rock. P1 is a measure of the free petroleum in the source rock evolving at lower temperature than the P2 peak, which represents oil and gas generated from breakdown of kerogen.

The temperature at which the P2 peak is at its maximum is called the $T_{max}$ value, usually expressed as ° C. This can be a valuable indicator of the thermal stress experienced by a source rock.

In order to express how much of the total carbon is reactive, the term hydrogen index (HI) is defined as:

$$HI = 100 * P2/TOC \qquad (Eq. 1)$$

The units are parts per thousand of carbon or mg/gC. Good oil-prone source rocks have HI values in excess of 500 mg/gC whereas lean source rocks tend to have HI values of 100-150 mg/gC or less.

The Hydrogen Index parameter determines how much petroleum could be generated from a source rock, but to know how much of this would be oil and how much would be gas, the Gas-Oil Generation Index or GOGI value is measured. This involves performing the Rock-Eval™ heating experiment described above, except that the P2 peak is analysed by gas chromatography to determine the overall yield of gas and the overall yield of oil from the kerogen breakdown A good oil-prone kerogen has a GOGI value of 0.2 or less whereas gas-prone kerogens have GOGI values in excess of 1.

The free oil in a source rock is measured by the P1 peak and to express this as a fraction of the overall carbon, the P1TOC (or TI—Transformation Index) parameter is defined as:

$$TI = 100 * P1/TOC \qquad (Eq. 2)$$

The units are mg/gC. This free oil affects how much oil and gas needs to be generated from the kerogen before expulsion can take place as effectively there is some pre-existing oil saturation of the kerogen before thermal generation occurs.

The final parameter needed to define overall yield of petroleum from a source rock is its net thickness. The thickness of the source layer helps in calculating the overall volume of hydrocarbons generated. Many of the rock properties are calculated on a 'per km² of rock' basis, hence they can be scaled up depending on the areal extent of a source rock. The Orgas scheme calculates initial and generated masses, normalising them to unity initially. When kerogen breaks down to form oil and gas, oil and gas fractions are split between expelled and retained but overall the sum of all carbon masses is still unity. The relative proportions of reactive and inert carbon are calculated from the input values for hydrogen index, free oil (based on TI) and GOGI.

Each organofacies has its own set of kinetic constants to define oil and gas generation. Kerogen breakdown is split into a separate oil-fraction and gas-fraction, each with its own set of constants. As only a part of the generated oil is expelled from the kerogen, the remnant oil cracks to gas as thermal stress increases and the Orgas scheme calculates the extent of oil-to-gas cracking within the source rock using a first-order kinetic scheme.

The Orgas scheme sets a threshold for oil and gas adsorption within the kerogen and only when these thresholds are overcome can oil and gas be expelled (released). Oil and gas are defined herein by the carbon numbers of their constituent chemicals with gas having a carbon number in the range of C1-C5 (for example, methane, ethane, propanes, butanes, pentanes) and oil having a carbon number of C6 or greater.

In the original Orgas scheme, two adsorption constants were defined for oil and gas—$a_o$ and $a_g$—expressed as mg/gC. Corresponding separate oil and gas thresholds for expulsion are referenced to the carbon content within the source rock and as the source rock generates oil and gas, the overall carbon content decreases.

This scheme has run into difficulties for some organofacies types as it has been realised that the oil-prone source rocks could generate enough oil to reach the oil expulsion threshold, but not enough gas to reach the gas expulsion threshold and so the initial expelled fluid was predicted to contain no gas or has a zero gas to oil ratio (GOR).

The foregoing explains how oil and gas are generated under thermal stress, i.e. thermogenically. It is also understood that gas (e.g. methane) can be generated from the action of bacteria, i.e. biogenically, on organic matter in organic rich source rocks. The interaction between bacteria and organic matter during deposition and burial is complex with a variety of types of bacterial active during different stages of burial. Methane is generated in the methanogenesis zone either by the process of fermentation whereby acetate anions are generated and are subsequently reduced to methane and carbon dioxide or by reduction of carbon dioxide ($CO_2$). Originally $CO_2$ reduction was thought to be dominant in marine environments and fermentation dominant in freshwater environments. This is supported by hydrogen isotope data from gases generated in these different environments; however, recent studies indicate that acetate fermentation is the dominant process overall. The hydrogen isotope data are now thought to reflect differences in waters contained in the pores of the source rock rather than the type of bacteria operating in the marine or freshwater environment. Existing kinetic models consider only thermogenically generated oil and gas.

Recent exploration and production of unconventional hydrocarbon resource plays has demonstrated that the Orgas scheme will underestimate the amount of hydrocarbon fluid that is retained within the source rock. For example, data from shale gas plays, where thermally mature source rocks have been penetrated, show that large volumes of gas are retained in source rocks. This would not have been predicted by the Orgas scheme. In addition, this observed residual gas implies that less gas would have been expelled than the Orgas scheme was predicting.

It is important to predict reliably the volume and physical properties of the oil and gas retained in the source rock as this is sought for production from shale gas, coal bed methane and biogenic gas plays, for example by artificially fracturing ("fracking") the rock to allow the release of previously trapped gas. Hence the gas in place within such source rocks cannot be reliably predicted using the existing kinetic models which have been implemented within the commercially available software tools. Conversely, less oil and gas has been expelled in reality from the source rock than the Orgas scheme predicts, which impacts pre-drill volumetric predictions for petroleum in conventional plays.

SUMMARY

In accordance with one aspect of the present invention, there is provided a computer-implemented method for determining an amount of hydrocarbon fluid present in a rock of a hydrocarbon-producing reservoir, the rock comprising organic matter and porous and permeable inorganic matter, the method comprising the steps of:

receiving data relating to chemical and kinetic properties of the organic matter, rock lithology data, rock thickness and reservoir temperature and pressure data;

inputting the received data into a computer-implemented model; and operating the model so as to:
a) simulate hydrocarbon fluid generation in the rock based on the input data and thereby determine an amount of generated hydrocarbon fluid;
b) generate predicted data indicative of:
an amount of the generated hydrocarbon fluid adsorbed onto a surface of the organic matter;
an amount of the generated hydrocarbon fluid present in the pores of the organic matter, by determining the porosity of the organic matter based on the chemical and kinetic properties of the organic matter; and
an amount of the generated hydrocarbon fluid present in the pores of the inorganic matter, by determining the porosity of the inorganic matter based on the rock lithology data; and
c) determine a total amount of hydrocarbon fluid present in the rock based on the predicted data.

In accordance with the above aspect, there is further provided a system for determining an amount of hydrocarbon fluid present in a rock of a hydrocarbon-producing reservoir, the rock comprising organic matter and porous and permeable inorganic matter, the system comprising a processor and a data receiver, wherein:

the data receiver is arranged to receive data relating to chemical and kinetic properties of the organic matter, rock lithology data, rock thickness and reservoir temperature and pressure data; and the processor is configured to:
a) simulate hydrocarbon fluid generation in the rock based on the input data and thereby determine an amount of generated hydrocarbon fluid;
b) generate predicted data indicative of:
an amount of the generated hydrocarbon fluid adsorbed onto a surface of the organic matter;
an amount of the generated hydrocarbon fluid present in the pores of the organic matter, by determining the porosity of the organic matter based on the chemical and kinetic properties of the organic matter; and
an amount of the generated hydrocarbon fluid present in the pores of the inorganic matter, by determining the porosity of the inorganic matter based on the rock lithology data; and
c) determine a total amount of hydrocarbon fluid present in the rock based on the predicted data.

In accordance with the above aspect, there is further provided a computer program or a suite of computer programs comprising a set of instructions arranged to cause a computer or a suite of computers to perform the steps according to the above method, and a computer readable medium comprising the computer program.

In existing kinetic models, porosity in the source rock has been assumed to be unimportant, with all petroleum being sorbed within the organic matter (kerogen). Once the sorption threshold of the organic matter has been exceeded, hydrocarbon fluids are assumed to be expelled from the source rock. Previous models have therefore focused on what has been expelled from the rock, rather than what was actually retained. However, it has now been recognised that, in addition to sorption, porosity in the source is very important for retaining petroleum within the source rock and this porosity can be found in both the organic matter and the inorganic matrix of the source. Simulating hydrocarbon fluid generation in the reservoir enables quantitative modeling and prediction of the amount of porosity, both inorganic and organic, within the source. This allows the value of a potential source to be more accurately assessed prior to fracking.

Simulating the behaviour of the hydrocarbon fluid and the evolving porosity of the organic matrix provides a more accurate prediction of not only how much hydrocarbon fluid is retained in the source rock, but also where it is retained. A more accurate prediction of how much oil and gas has been expelled in the past (for example, oil and gas that has escaped under the natural pressure of the reservoir) can also be determined.

Further features and advantages of the method, system and computer program will become apparent from the following description of preferred embodiments, given by way of example only, which is made with reference to the accompanying drawings.

DETAILED DESCRIPTION

FIGS. 1a to 1f show the physical process of the generation, retention and expulsion of oil and gas in a hydrocarbon-producing source rock over time and with increasing temperature, incorporating features such as porosity, saturation and adsorption. A predictive model according to certain embodiments of the invention is capable of modeling this process.

The predictive model is configurable to provide a biogenic gas generation option; if this option is chosen, then upon execution the predictive model simulates generation of biogenic gas at lower temperatures before thermogenic generation begins at higher temperatures. As explained further below, the kerogen may be saturated with biogenic gas which is then eventually displaced by thermogenic hydrocarbon fluids as kerogen breaks down.

Figure 1A:
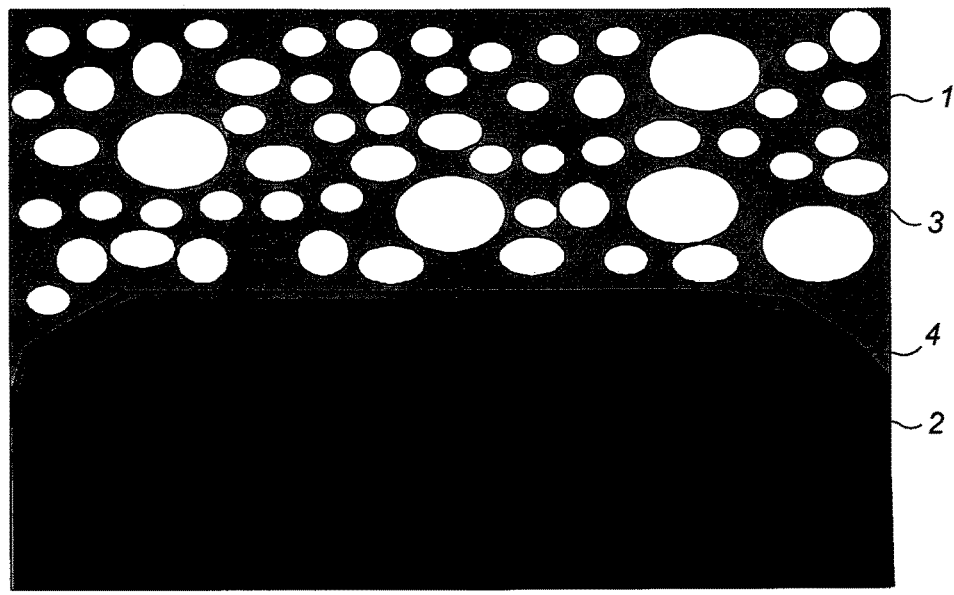
FIGS. 1a to 1f show the physical process of the generation, retention and expulsion of oil and gas in a hydrocarbon-producing source rock.

Referring to FIG. 1a, a cross-sectional area of source rock is shown. The source rock comprises a porous and permeable inorganic matrix 1, which initially contains formation water in its pores 3, and a section of organic matter 2 such as kerogen. Initially the kerogen 2 is mainly a solid with little or no porosity. The kerogen 2 has some petroleum adsorbed in a layer 4 onto its surface—this is the P1 TOC level defined for each source rock organofacies and is measured either by extraction from the source rock with solvent or from a Rock-Eval experiment as the P1 yield.

Figure 1B:
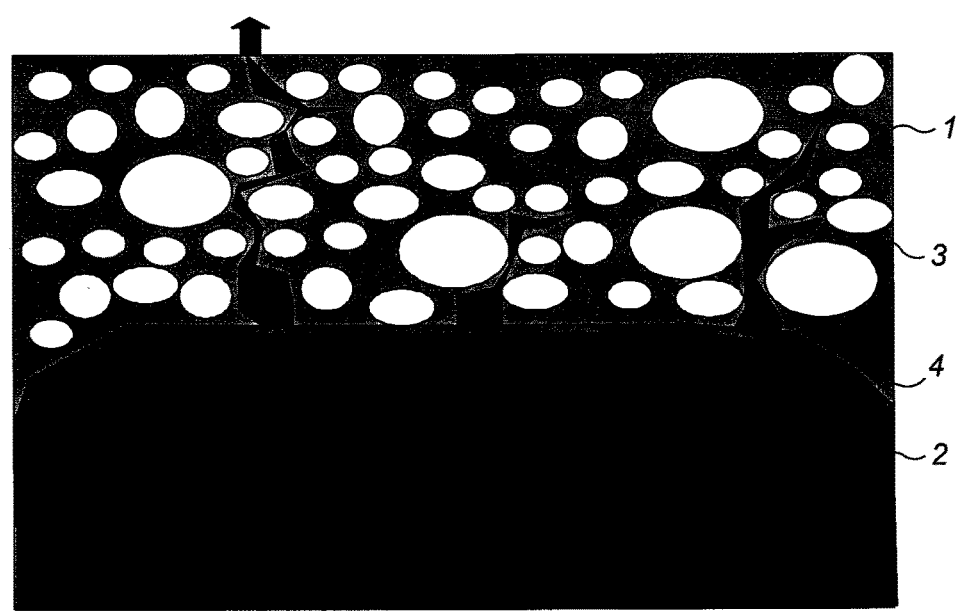

Referring to FIG. 1b, as the source rock is buried, biogenic gas in the form of methane is generated by the action of bacteria on solid kerogen, resulting in the kerogen 2 being saturated mainly with biogenic gas with the excess gas being expelled if sufficient gas volumes are generated. This typically takes place at temperatures of between 5° C. and 45° C.

Figure 1C:
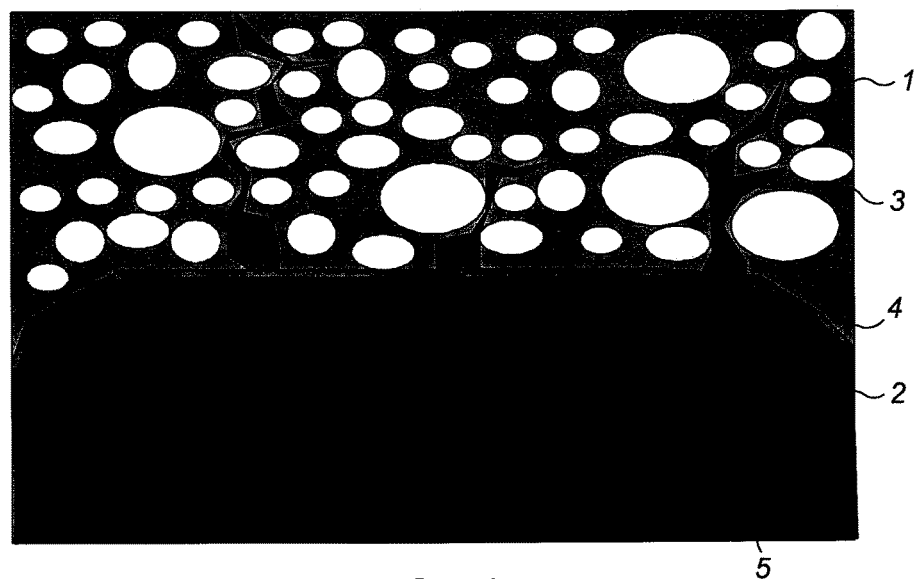

FIG. 1c shows the beginning of thermal gas generation. As the source rock burial increases over time and temperatures approach the onset of thermogenic generation (typically 90° C. or above depending on the organofacies type), the kerogen 2 begins to break down to oil/gas (typically petroleum) and some organic porosity 5 develops therein. At this stage there is not sufficient petroleum generated to be expelled from the organic porosity 5 and the inorganic matrix porosity 3 still contains biogenic methane. Typically, both inorganic and organic porosity evolve with burial and increasing thermal stress.

Figure 1D:
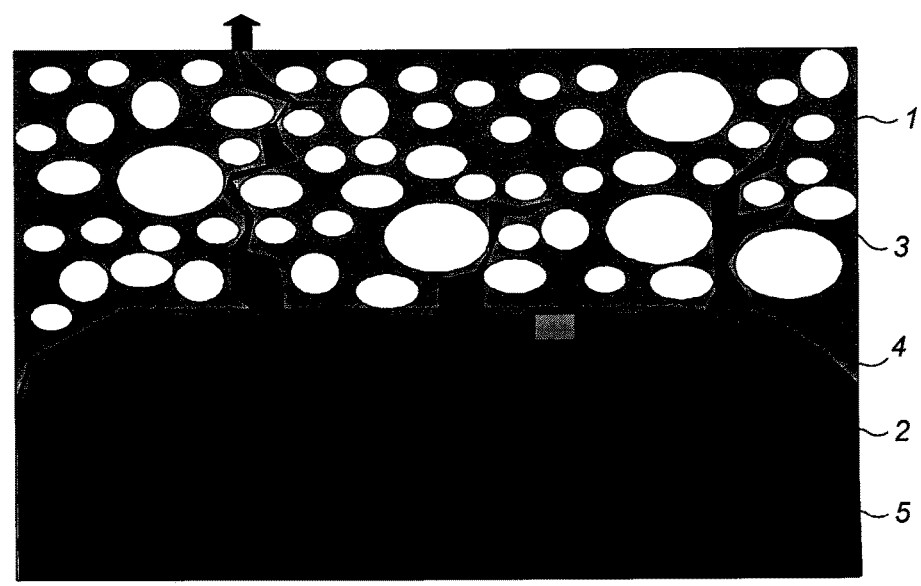

In FIG. 1d, kerogen breakdown evolves further, generating larger volumes of oil and gas. This petroleum mixes with the biogenic gas and saturates the adsorbed layer 4. The resulting mixture expels into the matrix porosity 3 and out of the overall source rock. The expelled oil/gas is therefore typically a mix of biogenically generated gas and thermogenically generated petroleum at this stage.

Figure 1E:
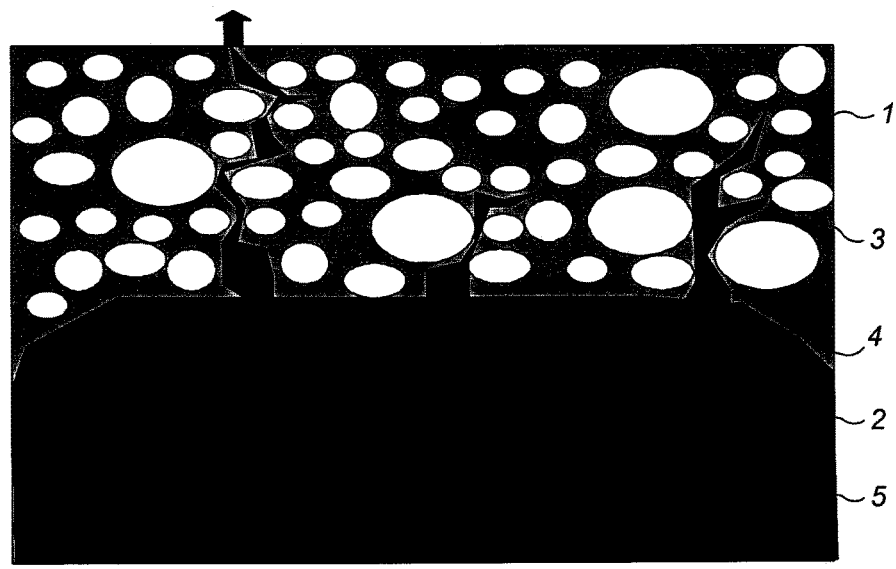

Referring to FIG. 1e, with increasing thermal stress, the retained oil cracks to gas. This results in higher remnant gas-oil ratios (GOR) and higher GOR values for the expelled fluid. The remaining (non-expelled) fluid chemically degrades to form more gas and an inert carbon residue (coke).

Figure 1F:
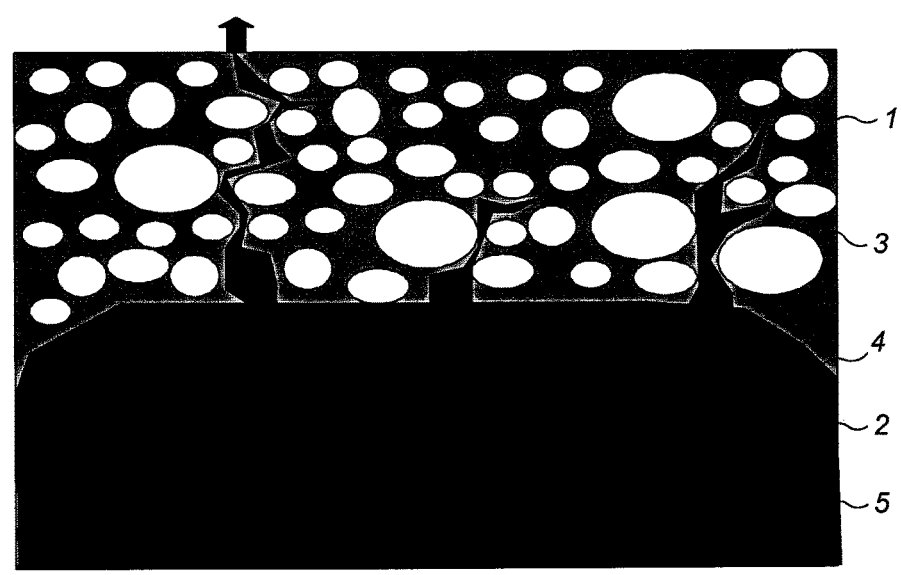

Finally, as shown in FIG. 1f, all the oil cracks to gas such that only gas remains in the source rock. As the temperature continues to rise, this gas becomes increasingly dominated by methane.

Figure 2A:
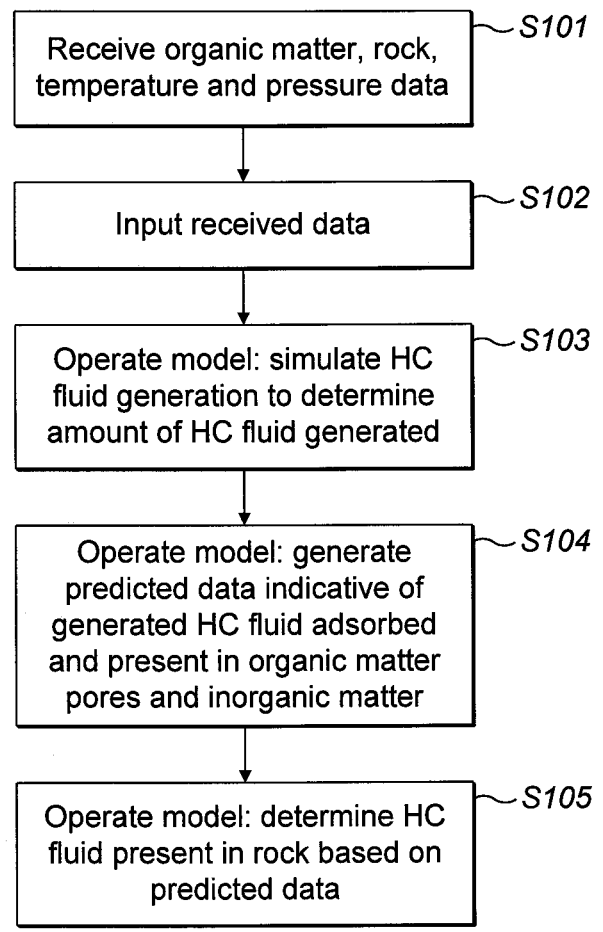
FIG. 2a is a flow diagram of steps taken by a predictive model in determining an amount of hydrocarbon fluid present in a source rock.

A computer-implemented model according to one embodiment is now explained with reference to FIG. 2a, which is a high level work flow of the steps taken by the embodiment. In step S101, the model receives data relating to chemical and kinetic properties of the organic matter (in an embodiment, this data comprises the organofacies type, TOC, kerogen density and kerogen concentration), rock lithology data, rock thickness and reservoir temperature and pressure data; this received data is input into the model at step S102. The pressure data input relates to the pressure exerted by fluids within the pores of a reservoir in which the source rock is situated. The model is then operated so as to: a) simulate (step S103) hydrocarbon fluid generation in the rock based on the input data and thereby determine an amount of generated hydrocarbon fluid; b) generate (step S104) predicted data; and c) determine (step S105) a total amount of hydrocarbon fluid present in the rock based on the predicted data.

The model is configured in step S104 to generate predicted data indicative of 1) an amount of the generated hydrocarbon fluid adsorbed onto a surface of the organic matter, 2) an amount of the generated hydrocarbon fluid present in the pores of the organic matter, by determining the porosity of the organic matter based on the chemical and kinetic properties of the organic matter, and 3) an amount of the generated hydrocarbon fluid present in the pores of the inorganic matter, by determining the porosity of the inorganic matter based on the rock lithology data. The predictive model can then determine the total amount of hydrocarbon fluid present, i.e. retained, in the rock based on the predicted data.

Determining amounts of retained and expelled oil/gas based on the physical process described in FIGS. 1a to 1f above requires that both the organic and inorganic matrix porosities 5, 3 are accurately modeled as both temperature and pressure change with increasing burial depths. The inorganic matrix porosity 3 generally decreases as burial increases (the weight of the overlying rock pushes the grains closer together, and in response the fluid flows out and porosity reduces; this is known as compaction). However, if pressure builds up in the fluid in the rock, then compaction can be inhibited.

Initially generated petroleum is assumed to saturate the kerogen 2 first via adsorption, followed by saturating the organic porosity 5 and then saturating the matrix porosity 3, before expulsion from the overall source rock bulk volume. If the model is configured to take account of biogenic activity, the model assumes that biogenic gas adsorbs onto the kerogen 2 and then fills the matrix porosity 3 only, as at low temperatures no organic porosity 5 exists prior to thermal breakdown of the kerogen 2.

Figure 2B:
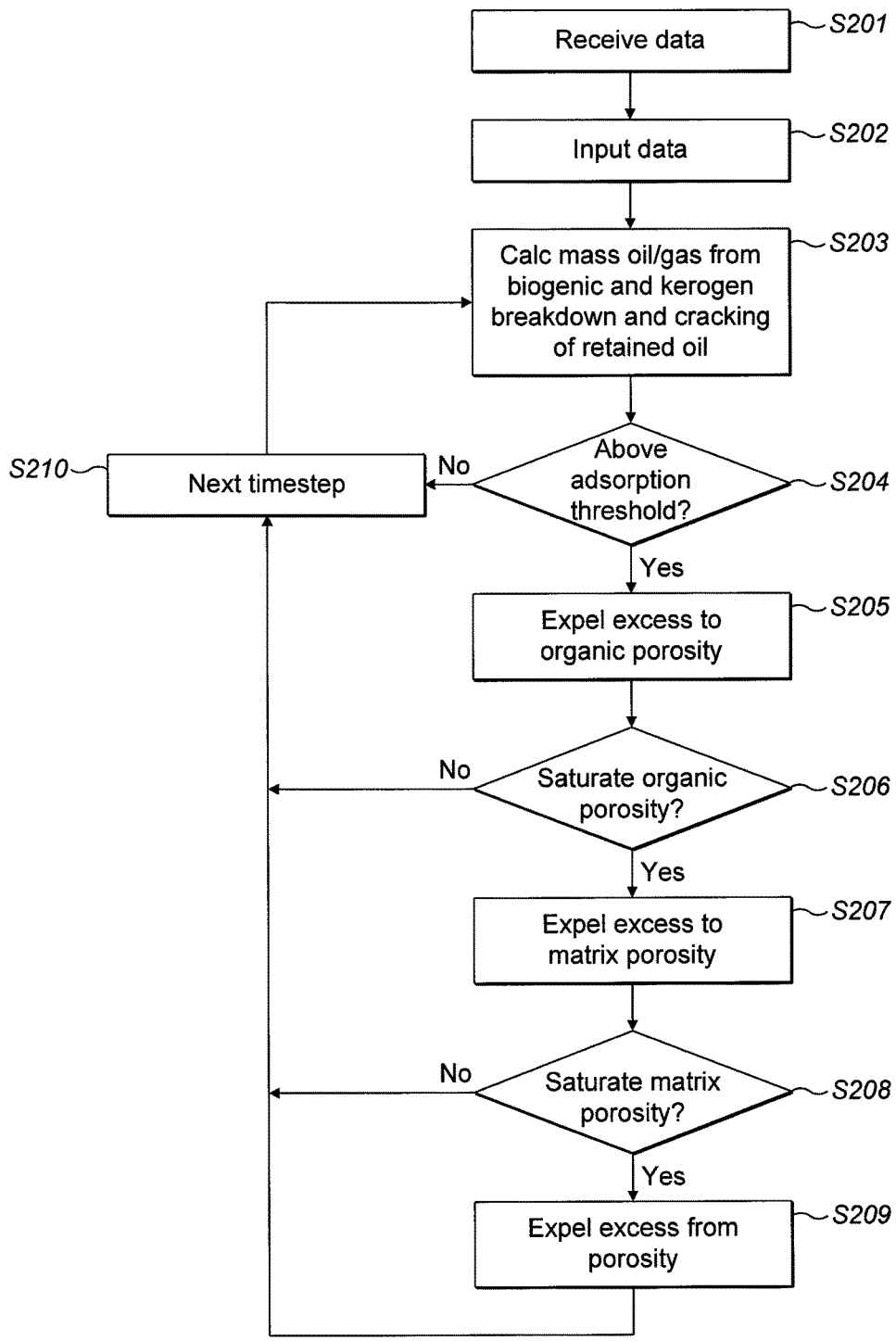
FIG. 2b is a flow diagram of steps taken by a predictive model in determining retention and expulsion of generated oil and gas in a source rock.

FIG. 2b shows another example of a high level workflow of the steps taken by the predictive model in determining retention and expulsion of generated oil and gas in a source rock. The predictive model takes into account the migration and distribution of hydrocarbon fluid on the source rock. Typically, all calculations are performed in mass terms, converted to volumes when required.

The predictive model defines a time-temperature history for each source rock considered. Initial and final temperatures are defined along with a heating rate in ° C. per million years to specify the temperature range for the calculation. Each timestep typically increases the temperature based on the incremental temperature rise for that timestep (although temperature may decrease over time if appropriate when modeling more complex thermal histories):

$$T = To + dt*HR \quad \text{(Eq. 3)}$$

Where T is the current temperature in ° C., To is initial temperature in ° C., dt is the timestep in Ma (million years) and HR is the heating rate in ° C./Ma.

The predictive model can also be configured to calculate fluid properties of the expelled petroleum, in which case the source rock pressure is also defined during burial. This is defined as:

$$P = P0 + PG*Z + PCZ^2 \quad \text{(Eq. 4)}$$

Where P is pressure in psi, P0 is initial surface pressure at mudline, PG is pressure gradient in psi/m, Z is depth below mudline (that is, the sea bed) in meters and PC is a pressure coefficient.

The kinetic scheme for oil and gas generation and expulsion from source rocks predicts the masses of hydrocarbon fluid being expelled. However, many important economic and engineering parameters are based on volumetric properties of fluids such that it is advantageous to predict both surface volumes (i.e. volume at atmospheric pressure) and reservoir volumes. In addition, several properties of the oil and gas at surface are required for the assessment of hydrocarbon refining issues and for environmental purposes, and the prediction of certain fluid properties can give an insight into the maturity of the source rock. An embodiment can be configured to predict several fluid properties, based on a correlation of fluid properties for oils and gases especially related to how different organofacies-types affect overall properties. The predicted fluid properties include reservoir fluid density, reservoir viscosity, oil API gravity/density, gas gravity/density, gas dryness, SARA (saturated hydrocarbons, aromatic hydrocarbons, resins and asphaltenes) composition, metals content and sulphur content. The relevant calculations and constants have been derived based on statistical analysis of measured fluid property data. The minimum inputs are the organofacies kinetic constants (which can be estimated from the estimated organofacies type) and the temperature that the source rock has been buried to (an assumption can be made based on the gradient of the basin, or based on a 3D model of the basin; the depth and temperature gradient can be estimated from seismic data. Therefore, areas for exploration can be prioritised or advantageous places to drill can be decided on within a particular acreage without requiring fluid to be sampled.

An option also exists within the predictive model to simulate a more complex thermal history, using a depth versus pressure profile that includes an overpressure gradient starting at a specific depth. Water depth is defined, and is assumed to be constant over time. If drilling is being considered onshore at sea level, the water depth is considered to be zero; input data can also take account of a height above sea level. The overpressure gradient is defined as the excess pressure gradient above hydrostatic pressure. Overpressure can be caused in several ways. One way is when rocks are buried very rapidly and the pore fluid cannot escape quickly enough such that there in an excess pore pressure. This results in a higher porosity than expected for the relative burial depth. This enhanced porosity therefore provides additional storage capacity in the rocks. The pore pressure is calculated as follows:

If Depth is Less than the Depth to Onset of Overpressure:

$$\text{Pore pressure} = (\text{water depth} * \text{hydrostatic\_grad}) + \text{depth} * \text{hydrostatic\_grad} \quad \text{(Eq. 5a)}$$

If Depth is at or Greater than the Depth to Onset of Overpressure:

$$\text{Pore pressure} = (\text{water depth} * \text{hydrostatic\_grad}) + \text{depth} * \text{hydrostatic\_grad} + (\text{depth} - \text{OPdepth}) * \text{OPGradient} \quad \text{(Eq. 5b)}$$

Where:
Pore pressure is pressure in pore space in psi;
Water depth is depth to seabed in ft;
Depth is depth below seabed in ft;
hydrostatic_grad is hydrostatic pressure gradient in psi/ft;
OPdepth is depth to onset of overpressure in ft;
OPGradient is overpressure gradient in psi/ft.

In step S201, the model receives data relating to predetermined chemical and kinetic properties of the organic matter based on the organofacies type of the source rock. The received data is then input, in step S202, into the predictive model, which is configured to simulate hydrocarbon fluid generation in the source rock.

Execution of an embodiment will now be described. In step S203, the mass of oil/gas generated thermogenically (and biogenically, if this option is selected) and the degree of cracking of the oil to gas, is predicted for a particular timestep and associated temperature. Any initially retained oil is partially cracked to gas such that the mass of retained oil and gas on the kerogen can be calculated. The model assumes that a petroleum phase is adsorbed onto kerogen and that this phase has an evolving gas fraction as thermal stress increases.

The biogenic gas calculations are based on a calculation of the yield of biogenic methane derived from the action of bacteria on organic matter in organic rich rocks. This biogenic gas calculation can be integrated into the thermogenic oil/gas calculations described below, such that a total amount of generated oil and gas can be predicted.

In order to model methane generation, it is necessary to know how much of the kerogen is reactive, how quickly this converts to methane with increasing time and temperature (kinetics), and how efficient the overall process is (microbial efficiency). In order to estimate the quantity of reactive kerogen, mass balance considerations from elemental analysis of kerogens can be used. During diagenesis, atomic H/C and O/C ratios decrease and from these changes the amount of methane generated can be estimated based on the reactions involved:

$$\text{Organic matter} \rightarrow CO_2 + 4H_2 \rightarrow CH_4 + 2H_2O \quad \text{(Eq. 6a)}$$

$$CH_3COOH \rightarrow CH_4 + CO_2 \quad \text{(Eq. 6b)}$$

In the reduction process (Eq. 6a), two atoms of oxygen are lost compared to carbon for every molecule of methane generated, whereas in the fermentation process (Eq. 6b) it is 1:1. From these changes the fraction of carbon lost during diagenesis is estimated to be bigger for fermentation compared to reduction.

For kinetics, it is necessary to look at the rate of acetate generation; however, it is thought that acetate is rapidly broken down to $CO_2$ and so $CO_2$ generation kinetics can be used as a proxy for acetate generation. Recent published work has examined the rate of $CO_2$ generation from sediments and generated a kinetic scheme for its generation versus temperature. Some $CO_2$ is generated relatively early on at temperatures less than 20° C. but with a main phase of $CO_2$ generation occurring between 20° C. and 50° C.

For microbial efficiency, laboratory experiments testing bacterial activity at varying temperatures suggest that efficiency is highest at around 40° C.

Figure 3:
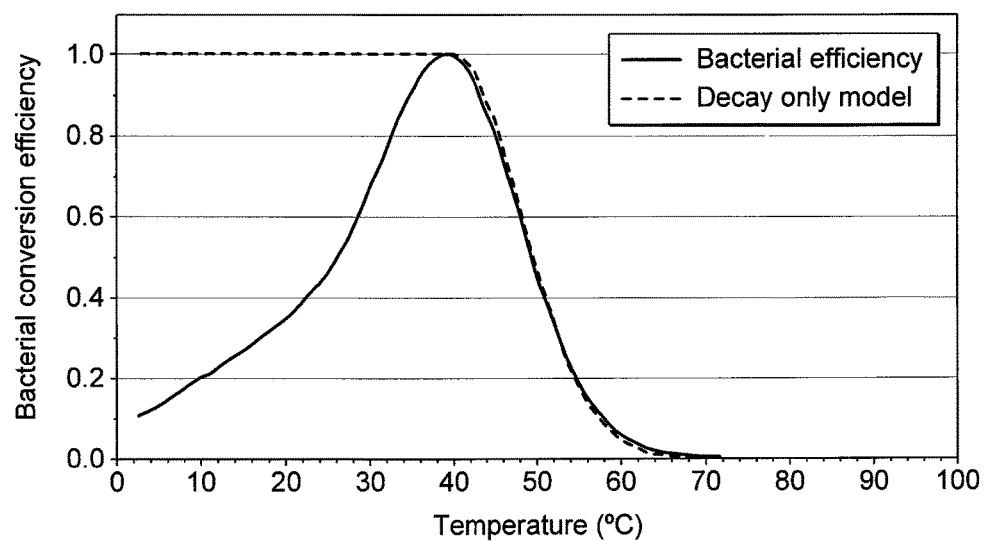
FIG. 3 shows a comparison of the results of two differently configured models for predicting biogenic gas generation.

In the predictive model, three options are available for modeling the biogenic gas generation. The first assumes a simple thermal model where bacterial efficiency is the main control. Two normal distribution curves are used to model a pair of zero-order reactions, and each reaction is scaled using relative scaling parameters. The second option is to choose a hybrid model in which carbon dioxide is generated from the decay of organic matter and the bacterial efficiency curves calculated above are used to calculate the overall volume of methane generated. The generation of carbon dioxide can be calculated using a weighted average of three first order kinetic reactions. The third option is a forced decay option which assumes that bacterial efficiency is high but then decays between about 40° C. and 70° C. FIG. 3 compares the (first) original bacterial efficiency and the (third) decay only model efficiency.

For the decay only model, efficiency is described by a normalised distribution curve from a start temperature (40° C.) and a standard deviation of 8° C. The equations are:

$$\text{If } T<40 \text{ BE}=1 \quad \text{(Eq. 7a)}$$

$$\text{If } T>=40 \text{ BE}=\text{NormDist}(T,\sigma,0)/\text{NormDist}(T_0,\sigma,0) \quad \text{(Eq. 7b)}$$

Where:
BE is bacterial efficiency;
T is current temperature in ° C.;
$T_0$ is start temperature of decay (40° C.) in ° C.;
σ is the standard deviation in ° C.;
NormDist is the normalised distribution function in Excel.

The overall yield of biogenic gas conversion is scaled depending on which model is chosen and also on which organofacies source rock type is being modeled. The overall percentage conversion factors are shown below:

| Pure bacterial model | |
|---|---|
| Organofacies A-DE | 8.7% |
| Organofacies F | 6.0% |

| CO2 potential in hybrid model | |
|---|---|
| Organofacies A-DE | 29.7% |
| Organofacies F | 28.0% |

The kinetics of thermogenic oil and gas generation are now explained. The breakdown of kerogen to oil and gas is assumed to be a first-order chemical reaction:

$$dc/dt = -kc \quad \text{(Eq. 8)}$$

Where c is the concentration of kerogen, t is time and k is the rate constant for the reaction. The rate constant is defined by the Arrhenius equation:

$$k = A\exp(-E/RT) \quad \text{(Eq. 9)}$$

Where A is the pre-exponential factor (in $\sec^{-1}$), E is the activation energy (in J/mol) and T is absolute temperature (in K). R is the universal gas constant.

The generation of petroleum (oil and gas) from kerogen proceeds via a complex series of parallel and consecutive reactions during which many types of physical and chemical bonds are broken as a result of thermal stress. It is assumed that the bond energies fit a normal (Gaussian) distribution with mean energy E and standard deviation σ.

The above equations are modified for each $i^{th}$ component of the kerogen to become:

$$dc/dt = -kc_i \quad \text{(Eq. 10)}$$

$$k_i = A\exp(-E_i/RT) \quad \text{(Eq. 11)}$$

The overall breakdown of kerogen is the sum of all the $i^{th}$ components multiplied by the weight of each component in the Gaussian distribution.

In known kinetic models, each organofacies has its own set of kinetic constants to define oil and gas generation. Kerogen breakdown is split into separate oil-fraction and gas-fraction breakdown each with its own set of constants. Therefore, each organofacies has a pre-defined value for $A_{oil}(\sec^{-1})$, $E_{oil}(kJ)$, $\sigma_{oil}(kJ)$, $A_{gas}(\sec^{-1})$, $E_{gas}(kJ)$ and $\sigma_{gas}$ (kJ).

The extent of oil-to-gas cracking within the source rock can be calculated using the same first-order kinetic scheme defined above. The kinetic constants for cracking are defined based upon a relationship with initial hydrogen index $HI_0$:

$$E = 223.6 + 7.5 \log(HI_0) \quad \text{(Eq. 12)}$$

$$\sigma = 32.5 - 8.55 \log(HI_0) \quad \text{(Eq. 13)}$$

This relationship is based upon an assertion that rich kerogens will generate oils that are more difficult to crack compared to oils derived from lean source rocks.

In step S204, the model determines whether the predicted amount of generated hydrocarbon fluid exceeds an adsorption threshold value. The adsorption threshold value is typically set at 100 mg/gC, and there are no separate adsorption thresholds for gas (C1-C5 hydrocarbons) or oil (C6+ hydrocarbons). Instead, the gas fraction of the adsorbed petroleum is considered to form one single phase with an evolving petroleum composition and adsorption threshold controlled by pressure, temperature, maturity and nature of the organic matter. The gas fraction evolves as thermal stress increases. The change in gas fraction is controlled by the source rock kinetics as described above.

If the adsorption threshold value is exceeded, the model proceeds to step S205, where the excess generated amount of hydrocarbon fluid is considered by the model to be expelled to the organic porosity. Organic porosity is created as solid kerogen breaks down into liquid and gaseous petroleum due to density and volume changes. This has been well documented in coals where porosity has been shown to decrease initially as the thermal maturity (calorific value) of the coal, or coal rank, increases, followed by an increase in porosity as oil and gas is generated from the coal. Organic porosity is also generated in organic rich shales and is known to be related to kerogen breakdown and has been identified as nanopores within the organic matter itself. Studies on the Eagle Ford and Barnett shales show that the level of organic porosity is low at maturities less than about 0.7-0.8% Ro but is well developed at higher levels of maturity. "% Ro" is the vitrinite reflectance of the source rock. Vitrinite is an organic component of coals and of most kerogens. Vitrinite reflectance indicates the thermal maturity of hydrocarbon-bearing source rocks, as it is sensitive to temperature ranges that largely correspond to those of hydrocarbon generation. Vitrinite reflectance can be measured using a standard geochemical technique, where samples of rock are placed in a resin block and light is reflected off the vitrinite particles present in the rock.

The pores in the organic matter (hereinafter "organic porosity") are thought to be mainly saturated with petroleum and is a significant storage mechanism for oil and gas during the generation and expulsion window. The estimation of organic porosity is based on volume loss when solid kerogen is converted to petroleum. The equation used by the predictive model is:

$$\text{Porosity\_Organic}(n)= ((\text{Kerogen\_Density}*\text{TOC\_initial}/0.8)-(\text{Kerogen\_Density}*\text{TOC\_final}/0.8))/\text{Kerogen\_Density} \quad \text{(Eq. 14)}$$

Where:
Porosity_Organic is fraction porosity in organic matter;
TOC_initial is the initial TOC value of immature source rock as a fraction;
TOC_final is the TOC value as a fraction; and
Kerogen density is the initial density of organic matter in kg/m$^3$.

The organic matter can been isolated and its density measured using standard laboratory techniques. TOC can also be measured in the laboratory on a sample by sample basis.

A hydrocarbon storage capacity of the organic matter is determined based on the predicted organic matter porosity. The porosity storage capacity can be calculated using the following equation:

$$\text{Storage capacity}=(\text{Porosity}/100)*(\text{Saturation threshold}/100)*\text{Petroleum Density} \quad \text{(Eq. 15)}$$

where: Storage capacity is in kg/m3—kg petroleum retained per m3 of rock;
Porosity is % Volume;
Saturation threshold is %; and
Petroleum density is kg/m3.

The saturation threshold is the percentage of the porosity which has to be saturated before the excess hydrocarbon fluid is expelled. For the organic porosity, the saturation threshold is typically 80-100%. The predictive model allows a user to choose a constant (e.g. 100%) organic porosity saturation threshold, or a variable saturation threshold (e.g. starting at 100% and reducing with increasing thermal stress). This is because there is evidence from US shale gas plays that gas migrates out of the source rock over time such that little gas is left at high maturity conditions (i.e. >3% Ro).

In step S206, the predictive model determines whether the predicted amount of generated hydrocarbon fluid also exceeds the storage capacity of the organic matter.

If the storage capacity of the organic matter is exceeded, the model proceeds to step S207, where the excess generated amount of hydrocarbon fluid is considered by the model to be expelled to the inorganic (matrix) porosity.

The saturation of petroleum within the inorganic matrix porosity can be a significant factor in determining the amount of retained petroleum during expulsion. It is therefore necessary to assign a lithology type to the predictive model calculations to calculate inorganic matrix porosity with increasing effective stress during burial.

For example, a subset of the main source rock lithology types can be incorporated into the predictive model calculations. Effective stress is calculated based on burial depth and any overpressure gradient input into the predictive model.

Figure 4A:
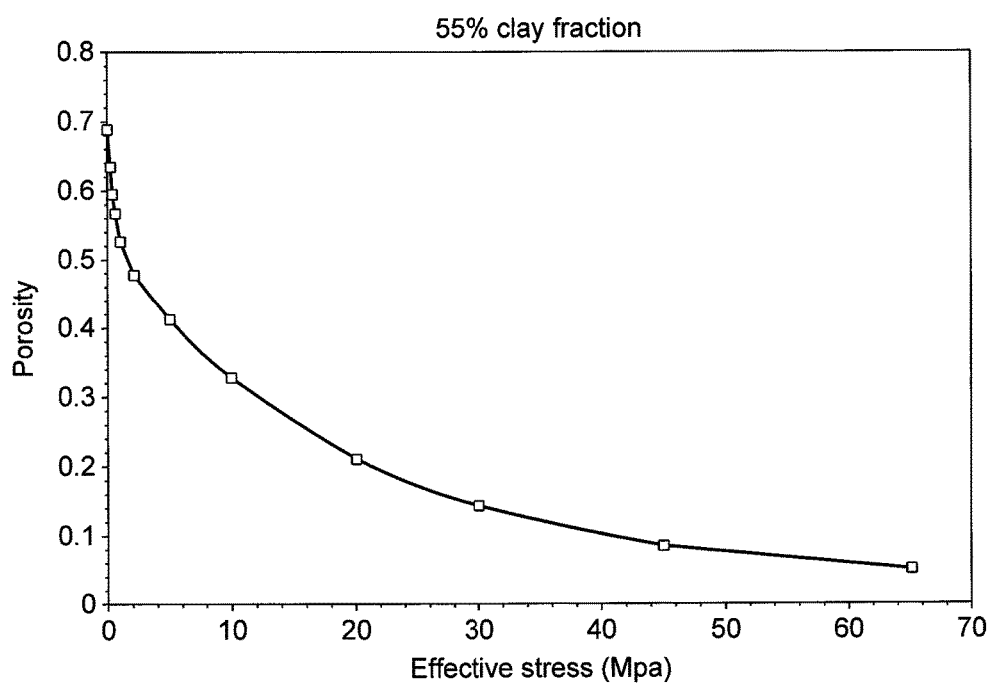
FIG. 4a shows a porosity-effective stress relationship used in the predictive model.
Figure 4B:
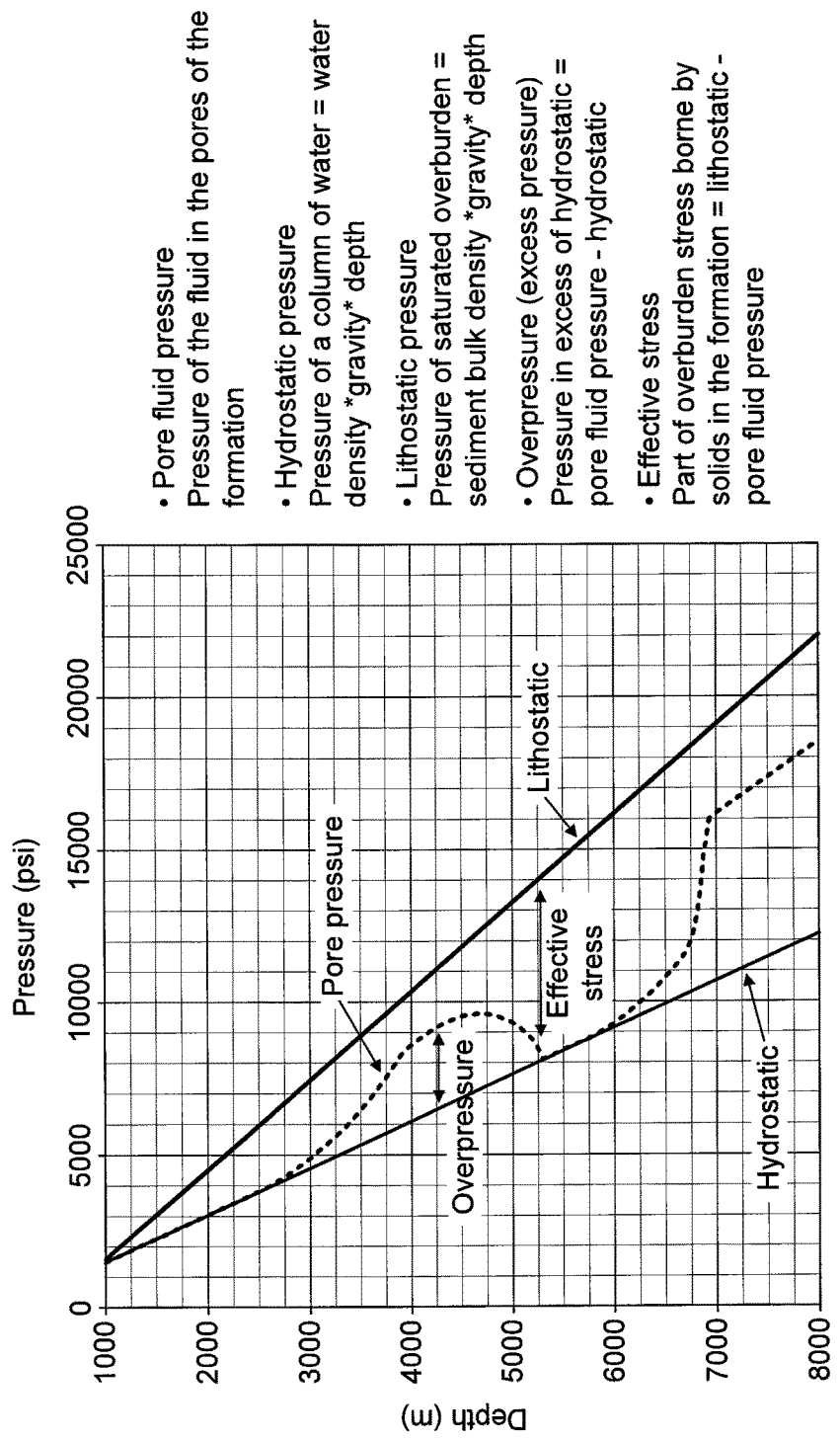
FIG. 4b shows how effective stress is defined as the difference between lithostatic pressure and pore pressure.

Correlations between effective stress and porosity for the inorganic matrix then used to determine the porosity. The graph in FIG. 4a shows a typical porosity-effective stress relationship that can be used in the predictive model. Effective stress is numerically the difference between lithostatic pressure and pore pressure, as shown FIG. 4b. Lithostatic pressure can be calculated from the bulk density of the rock and depth. Similarly hydrostatic pressure can be calculated from water density and depth.

The general form of the equations for effective stress prediction with increasing depth is:

$$\text{EffectiveStress}=a*Z^3+b*Z^2+c*Z+d \quad \text{(Eq. 16)}$$

Where:
Z is depth below seabed in m;
a, b, c and d are constants that are specific to each lithology type that are defined based on measured data from shale samples.

The general form of the equation to predict inorganic matrix porosity as a function of effective stress is:

$$\text{Porosity\_matrix}=x+y*\text{Exp}(-\text{EffectiveStress}/0.6)+z*\text{Exp}(-\text{EffectiveStress}/20) \quad \text{(Eq. 17)}$$

Where:
Porosity_matrix is the fractional porosity in the inorganic matrix;
EffectiveStress is Effective stress in MPa;
x, y and z are constants that are specific to each lithology type that are defined based on measured data from shale samples.

The above equation (Eq. 17) does not apply to all lithology types; for biogenic silica, loss of porosity is thought to be a function of thermal stress and an equation predicting porosity as a function of vitrinite reflectance has been used. For this material the equation for predicting matrix porosity is:

$$\text{Porosity\_matrix}=e+(f*\text{VitMean}^g)/100 \quad \text{(Eq. 18)}$$

Where:

Porosity_matrix is the fractional porosity in the silicate matrix;

VitMean is the predicted mean vitrinite reflectance value;

e, f and g are constants that are specific to biogenic silica, and which are defined based on measured data from shale samples.

A hydrocarbon storage capacity of the inorganic matter is determined based on the predicted porosity of the inorganic matrix. Again, the porosity storage capacity of the inorganic matrix is calculated using equation 15 above. The saturation threshold is the percentage of the porosity which has to be saturated before the excess is expelled. For the inorganic porosity, the saturation threshold is typically 2-20%.

In step S208, the predictive model determines whether the predicted amount of generated hydrocarbon fluid also exceeds the storage capacity of the inorganic matter. If the storage capacity of the inorganic matter is exceeded, the model proceeds to step S209, where the excess generated amount of hydrocarbon fluid is considered by the model to be expelled. The predictive model then determines a predicted amount of expelled hydrocarbon fluid corresponding to the excess amount by which the storage capacity of the inorganic matrix is exceeded.

If any of the adsorption value, the storage capacity of the organic matter or the storage capacity of the inorganic matter is not exceeded when operating the model for a current time step, the model proceeds to a subsequent timestep at step S210 and recalculates the predicted data for the subsequent time step and corresponding reservoir temperature data.

Therefore, according to the embodiment, storage of oil and gas is predicted in relation to three places within source rocks. Modeling the generation, retention and expulsion of hydrocarbon fluid in this way generates hydrocarbon storage capacities that are more realistic than is generated by previously known models. Only when all three storage capacities are saturated will expulsion occur.

The predictive model provides more accurate pre-drill predictions of the volume, composition and physical properties of expelled hydrocarbon fluids. This information is important for understanding the likely quality, value and volume of petroleum fluid that may be present in a basin or prospect, for conventional or unconventional play types.

Figure 5:
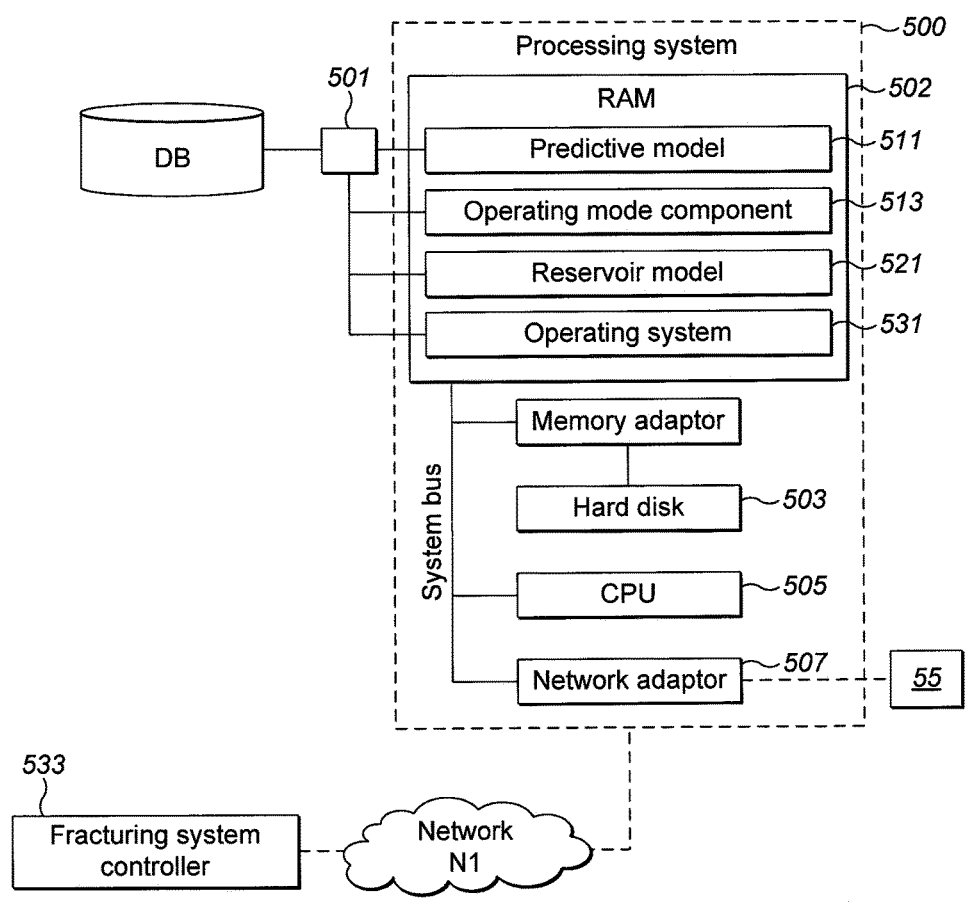
FIG. 5 shows a system for determining an amount of hydrocarbon present in a hydrocarbon-producing rock.

FIG. 5 shows a system 500 for determining an amount of hydrocarbon present in a hydrocarbon-producing rock. The system comprises a predictive model 511, which operates as described above in relation the embodiment of FIG. 2a or FIG. 2b.

The system is configurable to determine one or more operating modes of an artificial fracturing system, which can be configured to induce fractures at an appropriate location and depth of a source rock. In order to determine optimum settings of the various components of the artificial fracturing system, a reservoir model 521, which, as known in the art, is a conceptual 3-dimensional construction of a reservoir that is constructed from incomplete data with much of the inter-well space estimated from data obtained from nearby wells or from seismic data, may be employed. In conjunction with this, a reservoir simulation, that is, a computer model that predicts the flow of fluids through porous media (and is therefore based on the reservoir model) is employed. Using the reservoir model 521, the reservoir simulation can use information such as the volume and shape of the reservoir 3 (including the arrangement of overlying rock formations and the locations of any faults or fractures in the rock formations), the porosity of the oil-bearing rock formations, the permeability of the oil-bearing rock formation(s) in different directions (including the relative permeabilities to oil and water), the initial oil saturation of the oil-bearing rock formation(s), the location of production well(s) and injection well(s), predicted sweeps (the volume of the reservoir swept by a displacement fluid that is injected down the injection well(s)), in combination with the results of the predictive model 511, to provide an indication of where in the reservoir there is potential for successful artificial fracturing.

In one arrangement, referring to FIG. 5, the system 500 comprises a processing system arranged to execute the predictive model 511 and the reservoir model 521, for example a control system on a platform, which can comprise conventional operating system and storage components such as a system bus connecting a central processing unit (CPU) 505, a hard disk 503, a random access memory (RAM) 502, and input/output and network adaptors 507 facilitating connection to user devices and interconnection with other devices on a network N1. The Random Access Memory (RAM) 502 contains operating system software 531 which controls, in a known manner, low-level operation of the processing system 500. The server RAM 502 contains the models 511, 521 during execution thereof. Each model is configurable with measurement and/or predetermined data stored in a database or other storage component which is operatively coupled or connected to the processing system 500; in the system of FIG. 5, storage component DB stores all such data relating to the components of the system 500, including the predictive model 511, and is accessible thereby. The system 500 is preferably operatively connected to a controller 533 of the artificial fracturing system, for example via the network N1. The controller 533 of the fracturing system is automatically configured with the one or more operating modes determined by the system 500, the controller 533 being arranged to apply the one or more operating modes.

Measurement or predefined data is received by a receiver 501 of the system 500, for example via a graphical user interface into which the user can input data, or directly from measuring equipment 55, or from a database DB1. The received data may comprise specific measured values as directly measured by suitably positioned measurement equipment 55, or ratios of values of characteristics, or may comprise values derived from a number of separate characteristic measurements, according to known techniques. Therefore, the raw measured characteristics may, if necessary or preferred, be manipulated by appropriate software, executed by the CPU 505 of the system 500, in order to generate measurement data that are suitable for inputting into the predictive model 511. Such manipulation may simply comprise a measurement unit conversion or the creation of a required ratio of measured values.

The input parameters required for the expulsion model 511 are as follows. Many or all of the data received and input into the model is predetermined or estimated without requiring physical measurements or samples to be taken. For example, the temperature data can be estimated from known temperature gradients. The organofacies type can be input to identify some of the chemical and kinetic properties of the organic matter. TOC is independent of organofacies and can be measured for each source rock, or alternatively TOC (and other input parameters) can be assigned typical values based on available data if no direct measurements are possible.

Other input parameters include: the rock lithology type; rock thickness; and pressure data (lithostatic and pore pressures are used to calculate effective stress, and are determined based on bulk/water densities and burial depth).

Typical values can be used for kerogen density and concentration input values, as the variation in nature is not great.

Once the predictive model has run, data generated thereby is output in an appropriate form, for example a total mass or volume of retained hydrocarbon fluid may be output to a user's display, or this total value can be broken down to show where the fluids are retained.

Additionally or alternatively, software executed by the CPU 505 of the system 500 can determine, on the basis of the predicted data, the one or more operating modes of the fracturing system 553. In this embodiment, the predictive model 511 is configured to determine the operating mode(s) upon generation of the predicted data, or a separate software component 513 is provided.

In one arrangement, data relating to a threshold amount of hydrocarbon fluid that must be retained to make fracturing worthwhile can be stored in and accessed from the database DB as necessary in order to determine the operating mode. Alternatively or additionally, the operating mode can comprise one or more specific configuration settings for the fracturing system, such as a specific volume of fluid to be injected in an artificial fracturing process.

The predictive model 511, or the separate software component 513 for determining the operating mode, are configured to use a predetermined set of rules in conjunction with input data such as the relevant specified thresholds and/or predetermined values and the predicted data, in order to determine the operating mode. These rules are stored in and accessible from the database DB as necessary.

The computer-implemented method can further include an optional step of applying or inputting the determined operating mode into the controller 533 of the fracturing system.

In one embodiment, a calculation engine for the predictive model 511 is written in the Fortran programming language, and includes 1D thermal modeling routines so that complex thermal histories can be calculated. The predictive model 511 is configured to allow time to increase and temperature can increase or decrease as appropriate and the calculation will properly account for accumulated extents of reactions. The model can alternatively be programmed within Excel, using virtual basic or alternative programming languages.

Figure 6:
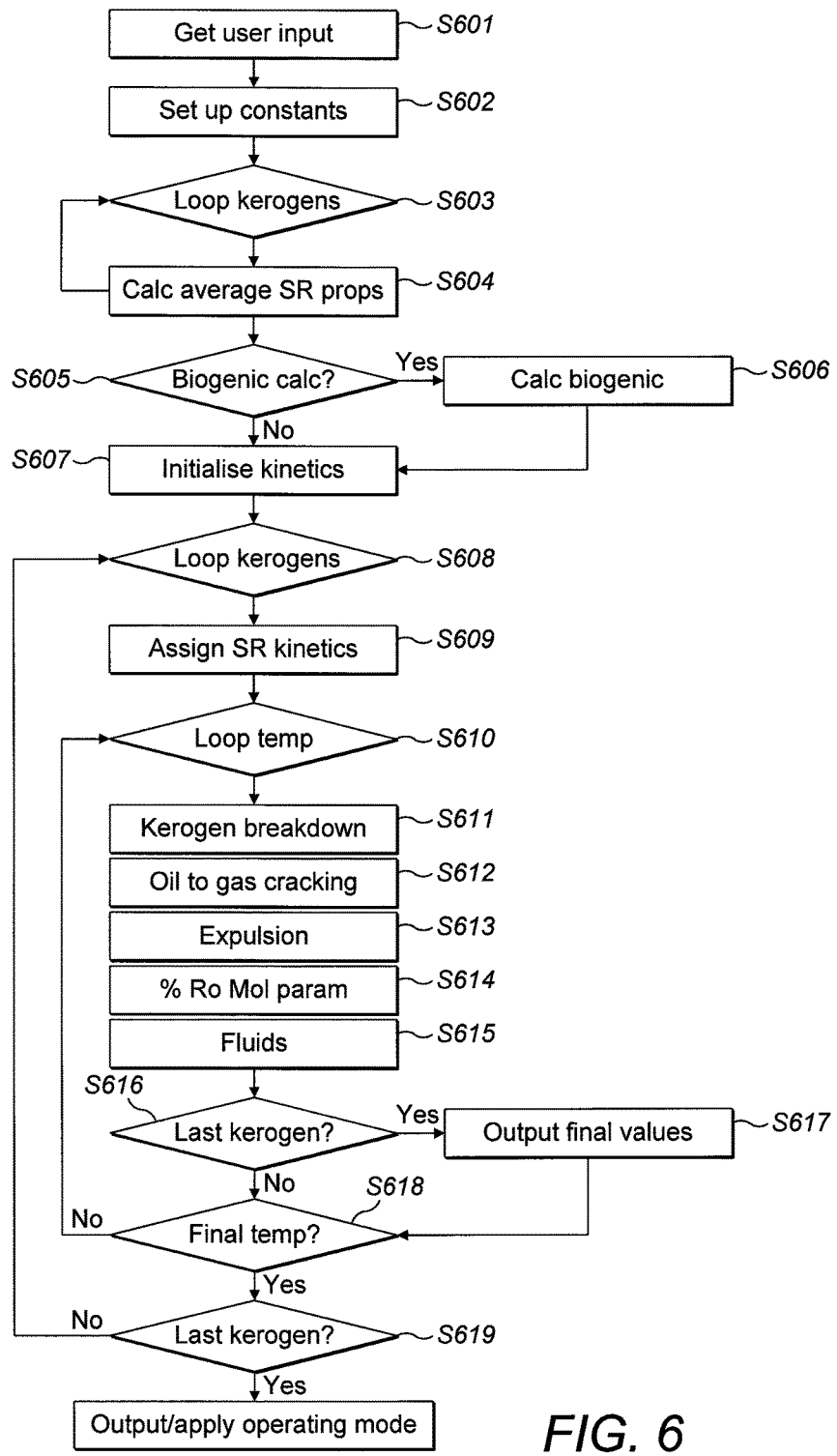
FIG. 6 shows a program flow for a model incorporating the predictive model of FIG. 2a or FIG. 2b.

FIG. 6 shows a program flow for a model incorporating the predictive model calculations explained above, as well as other optional parameters, as explained below. Interface 501 shown in FIG. 5 allows a user to input (step S601) multiple (e.g. 50) organofacies (kerogen) "sub-types" which make up the overall source rock; the sub-types can be created within each type by the user, who can vary parameters such as the TOC, GOGI, thickness, and Hydrogen index. Geochemical measurements from fluids can determine the contribution of each organofacies type to oil or gas in an accumulation. The program then initialises fixed constants including the kinetic constants for kerogen breakdown into oil and gas, kinetics for cracking, and richness/thickness data (step S602) and loops through all of the input sub-types and averages source rock properties of these to estimate overall values of the source rock properties such as TOC, thickness, organofacies type, HI and GOGI (steps S603 and S604).

At step S605, the program queries whether biogenically generated gas is to be considered. This question can be asked of the user via the interface or pre-programmed or entered when initially inputting data at step S601. If the biogenic option is selected, the amount of biogenically generated gas for the particular time step and corresponding temperature being considered is predicted (step S606).

At step S607, the program initialises all of the reactants and their initial values. The program loops through all of the kerogens (step S608), assigning the source rock kinetics for each one at step S609, and for each of a series of time-temperature steps (step S610) calculates the breakdown of kerogen (S611), the extent of oil to gas cracking (S612), the amount of gas retained/expelled (S613) according to the predictive model described with respect to FIG. 2a or FIG. 2b, the vitrinite reflectance (S614) and various fluid properties (S615) as described further below. Final values for of the required parameters are output at step S617 once it has been confirmed at step S616 that the last kerogen of those input has been considered. Steps S610-S17 are then repeated for each temperature in a required time period (NO at step S618). Once program has run for the final temperature in the time period (YES at step S618) and the program has looped through the last kerogen (YES at step S619), the program can output and/or apply the fracturing system operating mode.

Figure 7:
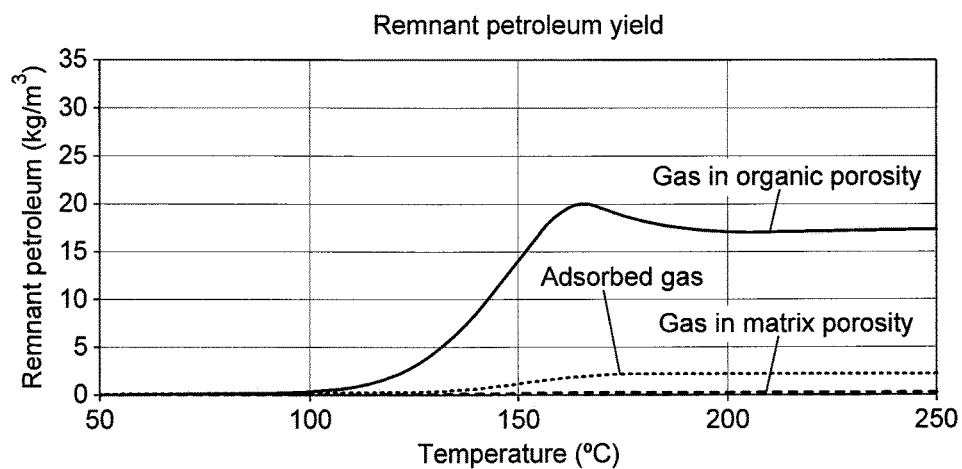
FIG. 7 shows an example of the amount of retained hydrocarbon fluid predicted by the predictive model of FIG. 2a or FIG. 2b.
Figure 8:
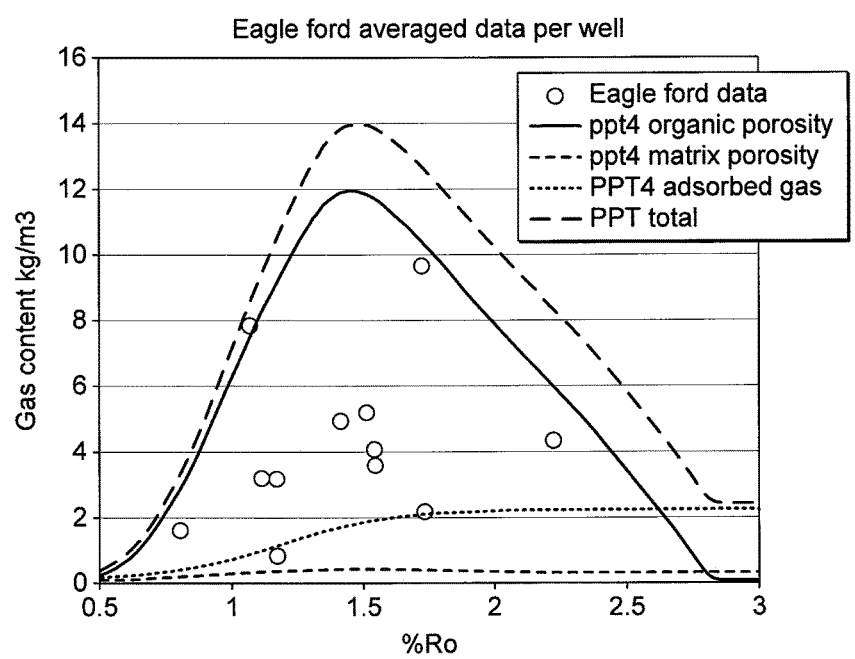
FIG. 8 shows an example of the predicted amount of retained hydrocarbon fluid compared to observed data from shale gas play samples.

FIGS. 7 and 8 show the results of one example output of the predictive model performed on the Eagle Ford onshore field. Source rock data from 34 wells of varying thermal stress was sampled and analysed for Shale gas, and the data was averaged for each well. The kerogen was assigned organofacies type A, HI of 600 mg/gC, initial TOC of 10% and residual TOC of 2-5% (at high maturity), and thickness of 100 m. The Orgas model results in very low residual gas estimations, of around 0.5 bcf/km$^2$ (approximately 0.1-0.2 kg/m$^3$) compared to the observed data. However, the predictive model, with additional inputs of a 20 mg/gC adsorption threshold, 2% matrix saturation and 100% organic porosity saturation results in at least 100 times more residual gas being predicted, most of which is predicted as being retained in the organic porosity, as shown in FIG. 7. These predictions correlate well with the observed data from core samples taken from the Eagle Ford wells, which showed that up to 10 kg/m$^3$ was retained, as shown in FIG. 8 where: the dots represent the observed data; line 1 represents the predicted gas present in the organic porosity; line 2 represents the predicted adsorbed gas; line 3 represents the predicted gas present in the matrix porosity; and line 4 represents the total predicted amount of gas retained in the source rock.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A computer-implemented method for determining an amount of hydrocarbon fluid present in a rock of a hydrocarbon-producing reservoir, the rock comprising organic matter and porous and permeable inorganic matter, the method comprising the steps of:
   receiving data relating to chemical and kinetic properties of the organic matter, rock lithology data, rock thickness, and reservoir temperature and pressure data;
   inputting the received data into a computer-implemented model; and operating the model so as to:
a) simulate hydrocarbon fluid generation in the rock based on the input data and thereby determine an amount of generated hydrocarbon fluid;
b) generate predicted data indicative of:
an amount of the generated hydrocarbon fluid adsorbed onto a surface of the organic matter within the rock;
an amount of the generated hydrocarbon fluid present in the pores of the organic matter, by determining the porosity of the organic matter based on the chemical and kinetic properties of the organic matter; and
an amount of the generated hydrocarbon fluid present in the pores of the inorganic matter, by determining the porosity of the inorganic matter based on the rock lithology data; and
c) determine a total amount of hydrocarbon fluid present in the rock based on the predicted data;
determining an operating mode of an artificial fracturing system based on the determined total amount of hydrocarbon fluid present in the rock;
applying the determined operating mode to the artificial fracturing system; and
performing a fracturing operation using the artificial fracturing system to which the determined operating mode has been applied;
wherein the step b) of operating the model so as to generate predicted data comprises:
determining whether the predicted amount of generated hydrocarbon fluid exceeds an adsorption threshold value;
if the adsorption threshold value is exceeded, determining a hydrocarbon storage capacity of the organic matter based on the predicted organic matter porosity and determining whether the predicted amount of generated hydrocarbon fluid also exceeds the storage capacity of the organic matter;
if the storage capacity of the organic matter is exceeded, determining a hydrocarbon storage capacity of the inorganic matter based on the predicted porosity of the inorganic matter and determining whether the predicted amount of generated hydrocarbon fluid also exceeds the storage capacity of the inorganic matter; and
if the storage capacity of the inorganic matter is exceeded, determining a predicted amount of expelled hydrocarbon fluid corresponding to the excess amount by which the storage capacity of the inorganic matter is exceeded.

2. The method of claim 1, wherein operating the model comprises generating the predicted data for each of a plurality of time steps to simulate hydrocarbon fluid generation in the rock over time, each time step corresponding to reservoir temperature data, and wherein:
if any of the adsorption threshold value, the storage capacity of the organic matter or the storage capacity of the inorganic matter are not exceeded when operating the model for a current time step, the model proceeds to recalculate the predicted data for a subsequent time step and corresponding reservoir temperature data.

3. The method of claim 1, wherein generating predicted data indicative of an amount of hydrocarbon fluid generated by the rock comprises predicting one or both of thermogenically and biogenically generated hydrocarbon fluid.

4. The method of claim 1, comprising configuring the predictive model to model the adsorbed hydrocarbon fluid as a single phase hydrocarbon fluid having a gas fraction that increases as temperature increases.

5. The method of claim 1, wherein generating the predicted data comprises determining gas-oil ratios of the predicted hydrocarbon fluid amounts such that corresponding amounts of oil and gas are predicted.

6. The method of claim 1, further comprising predicting one or more fluid properties of the generated hydrocarbon fluid based on the chemical and kinetic properties of the organic matter and the temperature data.

7. A system for determining an amount of hydrocarbon fluid present in a rock of a hydrocarbon-producing reservoir, the rock comprising organic matter and porous and permeable inorganic matter, the system comprising a processor and a data receiver, wherein:
the data receiver is arranged to receive data relating to chemical and kinetic properties of the organic matter, rock lithology data, rock thickness and reservoir temperature and pressure data; and
the processor is configured to:
a) simulate hydrocarbon fluid generation in the rock based on the input data and thereby determine an amount of generated hydrocarbon fluid;
b) generate predicted data indicative of:
an amount of the generated hydrocarbon fluid adsorbed onto a surface of the organic matter within the rock;
an amount of the generated hydrocarbon fluid present in the pores of the organic matter, by determining the porosity of the organic matter based on the chemical and kinetic properties of the organic matter; and
an amount of the generated hydrocarbon fluid present in the pores of the inorganic matter, by determining the porosity of the inorganic matter based on the rock lithology data; and
c) determine a total amount of hydrocarbon fluid present in the rock based on the predicted data;
d) determine an operating mode of an artificial fracturing system based on the determined total amount of hydrocarbon fluid present in the rock;
e) apply the determined operating mode to the artificial fracturing system; and
f) cause the performance of a fracturing operation using the artificial fracturing system to which the determined operating mode has been applied,
wherein the processor is configured in step b) to generate predicted data by:
determining whether the predicted amount of generated hydrocarbon fluid exceeds an adsorption threshold value;
if the adsorption threshold value is exceeded, determining a hydrocarbon storage capacity of the organic matter based on the predicted organic matter porosity and determining whether the predicted amount of generated hydrocarbon fluid also exceeds the storage capacity of the organic matter;
if the storage capacity of the organic matter is exceeded, determining a hydrocarbon storage capacity of the inorganic matter based on the predicted porosity of the inorganic matter and determining whether the predicted amount of generated hydrocarbon fluid also exceeds the storage capacity of the inorganic matter; and
if the storage capacity of the inorganic matter is exceeded, determining a predicted amount of expelled hydrocarbon fluid corresponding to the excess amount by which the storage capacity of the inorganic matter is exceeded.

8. A non-transitory computer-readable medium storing software instructions which, when executed by a processor, cause the processor to perform the steps according to claim 1.

\* \* \* \* \*